United States Patent [19]
Blackwell

[11] 3,738,801
[45] June 12, 1973

[54] UNIFORMLY DYED YELLOW WATER SWELLABLE CELLULOSIC FIBERS

[75] Inventor: John Blackwell, Kennett Square, Pa.

[73] Assignee: E. I. du Pont de Nemours and Company, Wilmington, Del.

[22] Filed: Aug. 6, 1971

[21] Appl. No.: 169,832

[52] U.S. Cl. .................... 8/21 C, 8/41 R, 8/41 C
[51] Int. Cl. ............................................. D06p 3/82
[58] Field of Search .................. 8/21 C, 41 C, 41 R

[56] References Cited
UNITED STATES PATENTS
3,510,241 5/1970 Dien .......................................... 8/4
3,578,388 5/1971 Dien ...................................... 8/41 C Primary Examiner—George F. Lesmes
Assistant Examiner—T. J. Herbert, Jr.
Attorney—Louis H. Rombach

[57] ABSTRACT

Water swellable cellulosic fibers, for example, cotton, or blends or mixtures thereof with synthetic fibers, for example, polyester fibers, uniformly dyed in fast yellow shades with 2,2'-(azo-di-p-phenylene)-bis(6-methylbenzothiazole).

3 Claims, No Drawings

UNIFORMLY DYED YELLOW WATER SWELLABLE CELLULOSIC FIBERS

BACKGROUND OF THE INVENTION

1. Field of the Invention

This invention relates to uniformly dyed water swellable cellulosic fibers and to dyed mixtures or blends of such water swellable cellulosic fibers and synthetic fibers.

2. Description of the Prior Art

It is well known in the art that synthetic fibers, for example, fibers prepared from polyesters, polyamides or cellulose acetate, can be dyed with a wide variety of disperse dyes whose solubilities in water vary from very low to moderately high. U.S. Pat. Nos. 3,510,241 and 3,578,388 disclose polyesters dyed with 2,2'-(azo-di-p-phenylene)-bis(6-methylbenzothiazole).

Natural fibers such as water swellable cellulosic fibers, especially cotton, are dyed by processes, and with dyes, which usually differ markedly from the processes and dyed employed with synthetic fibers. The conventional methods for dyeing water swellable cellulosic materials may be summarized as follows:

1. A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.
2. A water soluble preformed dye having an affinity for the cellulosic material is exhausted onto the material from an aqueous solution by a procedure which involves reducing the solubility of the dye in the aqueous solution, as with direct dyes.
3. A dye containing a substituent which reacts with the cellulose or a modified cellulose is exhausted onto the material from either an aqueous or non-aqueous solution under conditions such that the dye is chemically bonded to the substrate, as with fiber reactive dyes.
4. Water insoluble pigments are bonded to the cellulose with polymeric materials, as in pigment printing.
5. A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pat. Nos. 396,692 and 2,069,215 and British Pat. No. 1,071,074. A process employing water soluble preformed dyes for dyeing cellulose is discusses in the Journal of the Society of Dyers and Colourists, 73, 23 (1957).

The aforesaid processes suffer from a variety of disadvantages, such as complexity of application, inability to achieve a broad spectrum of colors, and low fastness of the dye cellulose to aqueous washing and/or drycleaning with organic solvents.

The use of dyes of low water solubility for dyeing cotton is disclosed in British Pat. No. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process in U.S. Pat. No. 3,313,590. Analogous to the dyeing of such blends and confirming the aforesaid distinction between water swellable cellulosic materials and non-water swellable cellulose acetate, U.S. Pat. No. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in Textile Research Journal, 32, 331-337 (1962) report that cotton can be swollen with water containing both high boiling, water soluble, non-reactive compounds of limited molecular weight and a cross-linking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. No. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. No. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

1. water in an amount sufficient to swell the cellulose;
2. a preformed dye in an amount sufficient to color the cellulose, a boiling saturated solution of which dye in 0.1 Molar aqueous sodium carbonate exhibits an optical absorbance not in excess of about 30; and
3. a solvent in an amount sufficient to maintain swelling of the cellulose if water is removed, and which
    a. is at least 2.5 weight % soluble in water at 25°C.,
    b. boils above about 150°C. at atmospheric pressure,
    c. is a solvent for the dye at some temperature in range of about 0° to 225°C., and
    d. has the formula

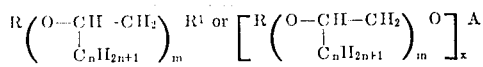

wherein
$n$ is 0 or 1;
$m$ is a positive whole number;
R is H, $C_{1-8}$ alkyl, $C_{7-15}$ aralkyl or alkaryl,

$R^2SO_2-$,

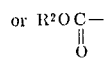

wherein
$R^2$ is $C_{1-8}$ alkyl, $C_{5-10}$ cyclo-alkyl, $C_{7-15}$ aralkyl or alkaryl, $C_6$ aryl, $C_{10}$ aryl, or furfuryl;
$R^1$ is $-OH$, $-OR^2$, $-SR^2$, $-NHR^2$, $-NR^2(C_{1-8}$ alkyl), $-NR^2(C_{7-15}$ aralkyl or alkaryl),

$-OSO_2R^2$,

$-NH(phenyl)$, or
$-NH(naphthyl)$, wherein $R^2$ is as defined above;
$x$ is the number of unsatisfied valencies in A; and
A is $ROCH_2CHORCH_2-$, $-CH_2CHORCH_2-$,

$-CH_2C(CH_2OR)_3$, $(-CH_2)_2C(CH_2OR)_2$, $-CH_2)_3CCH_2OR$, $(-CH_2)_4C$, $-CH_2(CHOR)_yCH_2OR$, $-CH_2(CHOR)_yCH_2-$, or $-CH_2(CHOR)_{y-z}(-CH)_z-CH_2-$ in which $y$ is 2, 3 or 4; $z$ is 0, 1, 2, 3 or 4 but no greater than $y$; and R is as defined above;
provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

Although many dyes which have limited water solubility may be applied to cellulosic fibers or to blends thereof with synthetic fibers, such as polyethylene terephthalates, by the aforementioned process, only a comparatively few such dyes have been found to have practical value for this end use. The great majority of dyes suffer from one or more of the following disadvantages:
a. they show a marked difference in shade on the cellulosic and synthetic components of blends of cellulosic and synthetic fibers.
b. they have inadequate fastness properties in one or more important respects (for example, light, washing, dry-cleaning or sublimation) on cellulosic or synthetic fibers, or both.

OBJECTS AND SUMMARY OF THE INVENTION

It is an object of the present invention to provide yellow, uniformly dyed, water swellable cellulosic fibers. A further object is to provide dyed blends or mixtures of water swellable cellulosic fibers and synthetic fibers wherein each component of the blend or mixture is dyed a similar shade. Still another object is to provide yellow, uniformly dyed, water swellable cellulosic fibers which have a high degree of fastness to light, washing, drycleaning, industrial laundering and sublimation. Another object is to provide yellow, uniformly dyed, water swellable cellulosic/polyester blend fabrics, especially cotton/polyester blend fabrics.

The present invention resides in yellow, uniformly dyed, water swellable cellulosic fibers or blends or mixtures of water swellable cellulosic fibers and synthetic fibers, said dyed fibers being fast to washing, drycleaning, light, sublimation and industrial laundering, wherein said dyed fibers the dye is 2,2'-(azo-di-p-phenylene)-bis(6-methylbenzothiazole).

DETAILED DESCRIPTION OF THE INVENTION

The aforesaid dye which is used in the preparation of the dyed fibers of this invention is a well known compound and can be prepared by conventional processes and techniques. For example, as described in Helvitica Chemica Acta 27, 1-8 (1944), it can be prepared by oxidizing dehydrothio-p-toluidine with sodium hypochlorite and reducing the resulting azoxy intermediate with sodium sulfide. The resulting yellow dye may contain a small amount of chlorine.

The cellulosic materials which can be dyed with the dye employed in this invention by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included in cotton which has been treated in any way which does not significantly reduce its swelling upon heating with water; raw or scoured cotton and cotton which has been mercerized or otherwise pre-shrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with 10 percent aqueous sodium hydroxide or the dyeing can be carried out in the presence of wetting agents, preferably of the nonionic type. Mixtures of cotton and rayon fibers can be dyed, and the dye employed herein also can be used to dye purified wood pulp and paper. Excluded as the water swellable cellulosic material, as considered herein, is cellulose acetate which does not exhibit the requisite swellability in the presence of water.

The synthetic materials which can be dyed with the dye employed in this invention include polyesters, polyamides, cellulose ethers and esters, and copolymers and mixtures thereof with other components intended to make them more easily dyeable or to add other desirable properties. The aforesaid dye can be applied to synthetic materials by conventional procedures, such as the Thermosol or aqueous dyeing procedures.

The dye employed in this invention can be applied to water swellable cellulosic materials, or to blends or mixtures thereof with synthetic materials by the above-described Blackwell et al. process. The dye employed in this invention is particularly useful for dyeing mixtures and blends of cotton and polyester or polyamide, such as mixtures containing 50 to 80 percent polyethylene terephthalate and 20 to 50 percent cotton. In such mixtures, the synthetic material is dyed using conventional process conditions. Since the aforesaid dye can be used to dye both components in a blend or mixture, scourability as a factor in dye selection is avoided since the previously described cross-staining problem has been minimized.

The dye employed in this invention dyes the substrate directly, that is, it does not require oxidation, reduction, hydrolysis, or any other chemical modification for development of color or fastness. The dye exhibits excellent fastness to light, washing, drycleaning, industrial laundering and sublimation.

In dyeing cellulosic materials with the aforesaid dye using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of dye, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dyebaths used in practicing this invention also can contain dyes other than that employed in this invention; for example, direct dyes or fiber reactive dyes for cotton or for polyamides can be present for shading purposes.

In the preferred dyeing procedure with the dye employed in this invention, an aqueous dye dispersion and the organic solvent are applied to the fabric from a single padbath. The amount of water in the padbath usually is 70–95 weight percent and the solvent, 5–30 weight percent. The padded fabric is heated at 180°–225°C. for 30–180 seconds. For cotton, temperatures as low as 150°C. usually are adequate. The dyed fabric generally is given an aqueous scour, or an aqueous scour followed by a perchloroethylene scour, to ensure complete removal of surface dye.

EXAMPLE 1

Dyeing 65/35 "Dacron" Polyester/Cotton Blend Fabric
A padbath was prepared from:

| | |
|---|---|
| an aqueous dye paste (15% active ingredient) containing 2,2'-(azo-di-p-phenylene)-bis(6-methylbenzothiazole) | 50 grams |
| purified vegetable gum thickener | 20 grams |
| methoxypolyethylene glycol (molecular weight 550) | 56.2 grams |
| butyl Carbitol | 18.7 grams |
| boric acid | 3.6 grams |
| water | to 1 liter |

A continuous length of 65/35 "Dacron" polyester/cotton fabric was padded at 60 uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously-moving fabric was passed through a circulating air oven at 80°–100°C., with a hold-up time of one minute, and then through an oven at 200°–210°C. with a hold-up time of 1.7 minutes. The hot dry fabric was cooled to room temperature and rinsed for one minute each in sequence: in water at 20°–30°C., in water at 90°–95°C. in water containing 1 percent of an ether-alcohol sulfate detergent, in water at 90°–95°C., and in water at 20°–30°C. The material was dried, then scoured for 5 minutes in perchloroethylene at 50°C., and dried again. The fabric was uniformly yellow in shade and exhibited excellent fastness to light, washing, drycleaning, industrial laundering and sublimation. A sample of the dyed blend fabric was treated with 70 percent sulfuric acid to remove the cotton portion (AATCC Test Method 20A–1959). The remaining yellow dyed polyester portion was slightly green and weak in shade in comparison to the blend fabric. The lightfastness of the dyed polyester and the dyed blend fabric was practically identical.

EXAMPLE 2

Dyeing Cotton Poplin

Example 1 was repeated except that a 100 percent mercerized cotton poplin was employed, the amount of glycol, Carbitol and boric acid each was increased 50 percent, and the maximum temperature was reduced to about 180°C. The material was scoured in aqueous detergent, then in perchloroethylene at 50°C. for 5 minutes, and dried, as described above. The cotton cloth was dyed a deep, uniform yellow shade. The light-, wet- and sublimation-fastness of the dyed material was similar to that of the dyed polyester-cotton fabric of Example 1.

EXAMPLE 3

Printing of 65/35 "Dacron" Polyester/Cotton Blend Fabric

A 65/35 "Dacron" polyester/cotton fabric was padded to about 60 percent pickup with an aqueous solution containing 125 grams per liter of polyethylene glycol (M. W. 350). The padded fabric was heated at 160°C. for 5 minutes to evaporate water. The fabric was then printed in a pattern with a print paste prepared from:

| | |
|---|---|
| an aqueous yellow paste (15% active ingredient) containing 2,2'-(azo-di-p-phenylene)-bis(6-methylbenzothiazole) | 10 grams |
| purified natural gum ether thickener | 60 grams |
| water | 30 grams |

The printed fabric was heated at 200°C. for 100 seconds, scoured in water containing an ether-alcohol sulfate detergent at about 90°C. for 5 minutes and dried. The printed areas were strongly dyed. The fastness properties of the print obtained were comparable to those of fabric dyed by the procedure of Example 1.

The embodiments of the invention in which an exclusive property or privilege is claimed are defined as follows:

1. Yellow, uniformly dyed, water swellable cellulosic fibers, said fibers being fast to light, washing, drycleaning, sublimation and industrial laundering, said dyed fibers being produced by contacting water swellable cellulosic fibers sequentially or concomitantly with water, ethylene glycol or a derivative thereof and, while the fibers are still swollen, 2,2'-(azo-di-p-phenylene)-bis(6-methylbenzothiazole).

2. The fibers of claim 1 admixed or blended with synthetic fibers which have been dyed with said dye.

3. The fibers of claim 2 wherein the synthetic fibers are polyester fibers and the water swellable cellulosic fibers are cotton fibers.

* * * * *